(12) United States Patent
Davis

(10) Patent No.: US 10,023,255 B1
(45) Date of Patent: Jul. 17, 2018

(54) TRANSPORTATION STORAGE SYSTEM AND METHOD OF USE

(71) Applicant: Truman R Davis, Abilene, TX (US)

(72) Inventor: Truman R Davis, Abilene, TX (US)

(*) Notice: Subject to any disclaimer, the term of this patent is extended or adjusted under 35 U.S.C. 154(b) by 10 days.

(21) Appl. No.: 15/334,455

(22) Filed: Oct. 26, 2016

Related U.S. Application Data

(60) Provisional application No. 62/246,172, filed on Oct. 26, 2015.

(51) Int. Cl.
*A47C 7/62* (2006.01)
*B62J 1/28* (2006.01)
*B62J 1/12* (2006.01)

(52) U.S. Cl.
CPC ... *B62J 1/28* (2013.01); *B62J 1/12* (2013.01)

(58) Field of Classification Search
CPC ...... B62J 1/00; B62J 1/002; B62J 1/28; B60R 7/00; B60R 7/04; B60R 7/043; B64D 11/0627
USPC .......................................... 297/188.11, 188.08
See application file for complete search history.

(56) References Cited

U.S. PATENT DOCUMENTS

| | | | | |
|---|---|---|---|---|
| 3,813,018 A | * | 5/1974 | Heltzen | B62J 1/28 190/107 |
| 3,963,158 A | * | 6/1976 | Clenet | B62J 9/00 224/413 |
| 4,266,703 A | * | 5/1981 | Litz | B62J 9/001 224/413 |
| 7,290,832 B2 | * | 11/2007 | Hanagan | B62J 1/28 297/188.01 |
| 2008/0157554 A1 | * | 7/2008 | Sakamoto | B62K 19/46 296/24.3 |
| 2010/0231011 A1 | * | 9/2010 | Lindsay | B60R 7/043 297/188.11 |
| 2010/0243691 A1 | * | 9/2010 | Salisbury | B62J 1/12 224/413 |
| 2011/0139843 A1 | * | 6/2011 | Thomas | B62J 1/28 224/413 |
| 2011/0233247 A1 | * | 9/2011 | Kanazawa | B62J 9/001 224/413 |
| 2013/0038473 A1 | * | 2/2013 | Lamoree | B64D 11/06 340/945 |
| 2013/0134747 A1 | * | 5/2013 | Reinhardt | B62J 1/28 297/188.05 |
| 2017/0106733 A1 | * | 4/2017 | Tsuji | B60K 1/04 |

* cited by examiner

*Primary Examiner* — Mark R Wendell
(74) *Attorney, Agent, or Firm* — Eldredge Law Firm, LLC; Richard Eldredge

(57) ABSTRACT

A combination motorcycle and storage device includes a motorcycle having a rear seat with an internal housing and a rear opening and a storage device includes a bottom panel pivotally attached to a plurality of side panels, the side panels being foldable on the bottom panel, the side panels forming an enclosure and secured to each other via a plurality of locking devices; and a retractable platform. The retractable platform includes a roller bearing assembly fixedly secured within the housing; and an elongated telescoping shaft slidingly engaged with the roller bearing assembly and fixedly secured to a bottom surface of the bottom panel.

1 Claim, 7 Drawing Sheets

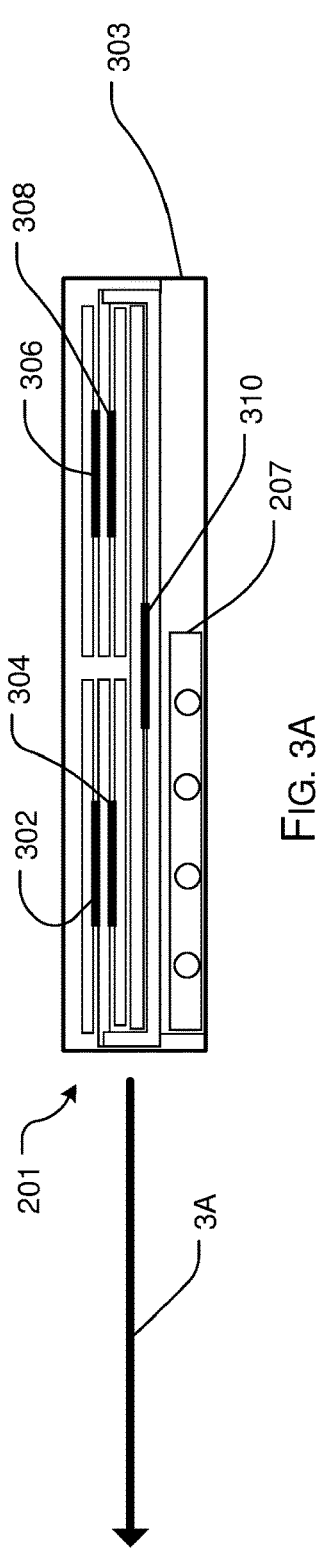
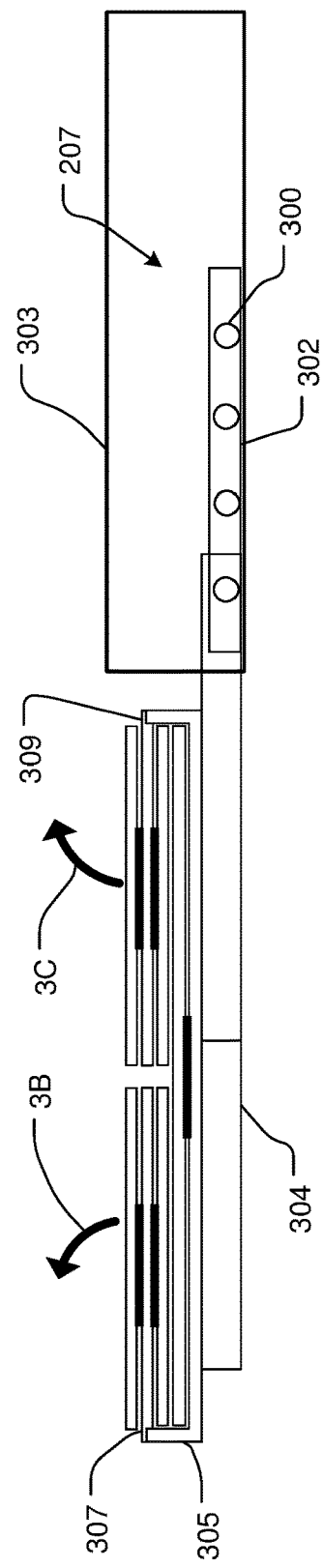
FIG. 3A
FIG. 3B

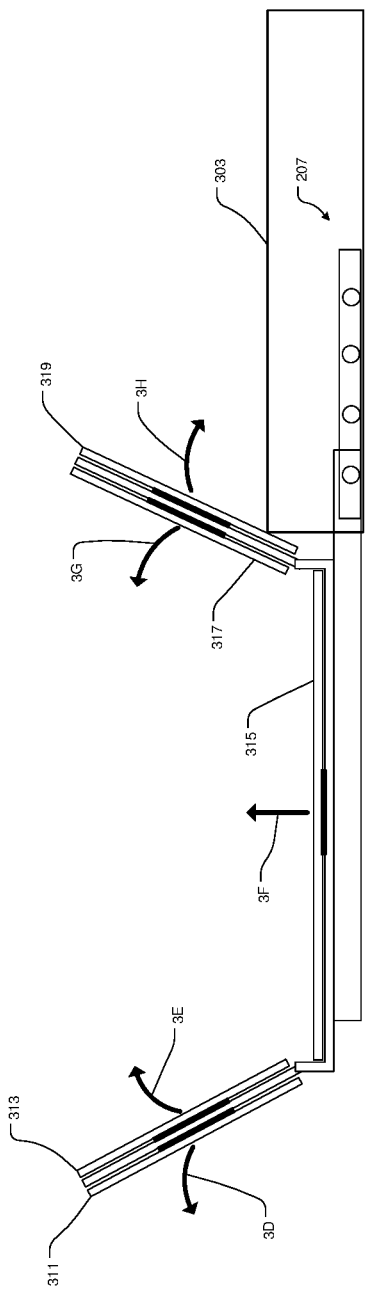
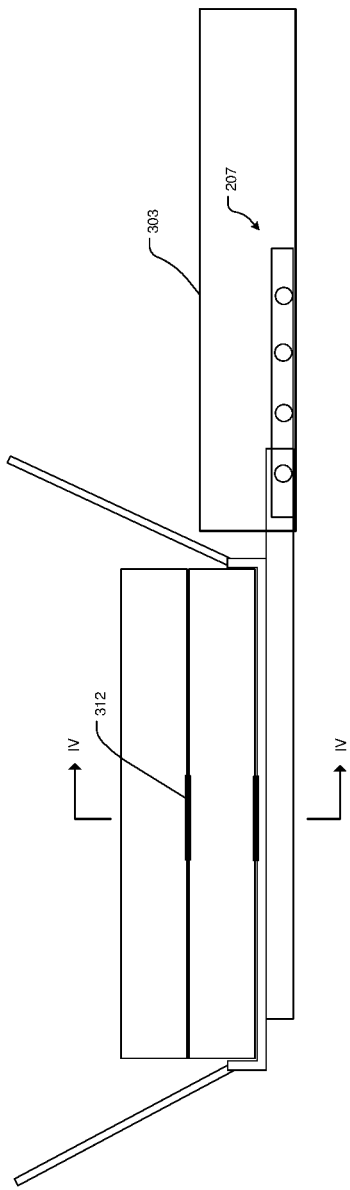

TRANSPORTATION STORAGE SYSTEM AND METHOD OF USE

BACKGROUND

1. Field of the Invention

The present invention relates generally to transportation storage systems, and more specifically, to a retractable storage system that can be concealed on or within a motorized or non-motorized vehicle.

2. Description of Related Art

Transportation systems are well known in the art and are effective means to transport items on a vehicle. For example, FIG. 1 depicts a conventional transportation storage system 101 comprising a vehicle 103 and one or more storage devises 105. During use, items (not shown) are stored in the rigidly attached bags.

One of the problems commonly associated with system 101 is limited space. Also system 101 exposes storage device 105 to harmful elements such as weather and theft.

Accordingly, although great strides have been made in the area of transportation storage systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 3A, 3B, 3C and 3D are side views of the system of FIG. 2;

Figure 1:
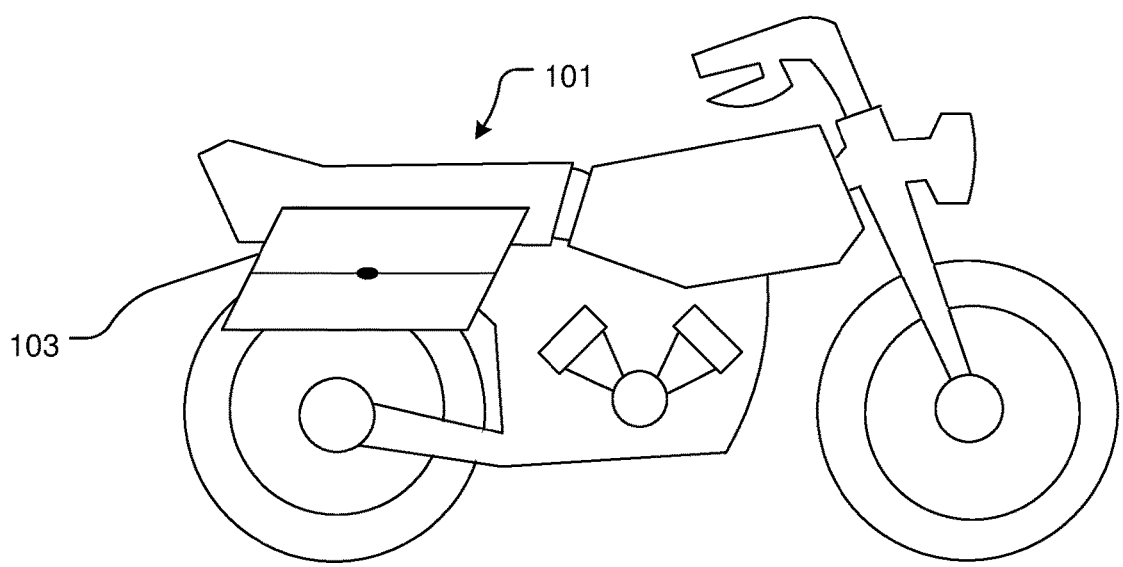
FIG. 1 is a simplified side view of a common transportation storage system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional transportation storage systems. Specifically, it provides for a transportation storage system that holds more and can be stowed when not in use. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
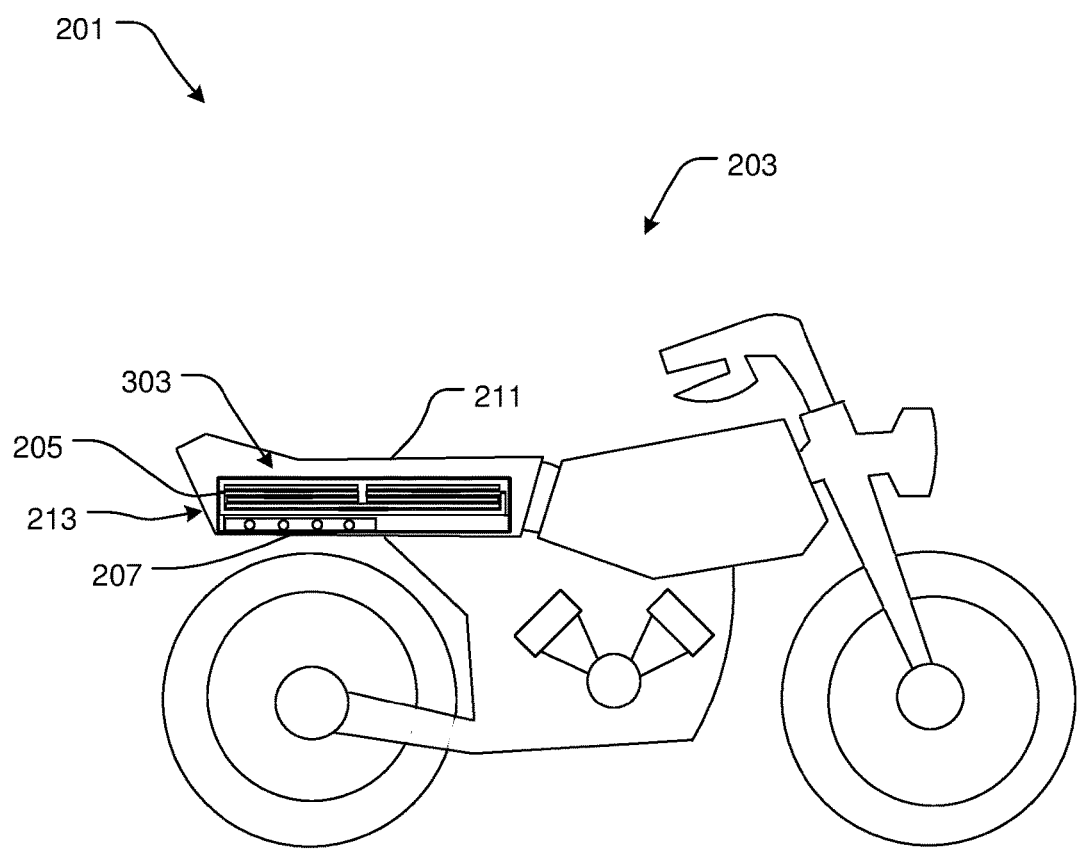
FIG. 2 is a simplified side view of a transportation storage system in accordance with a preferred embodiment of the present application.

Referring now to the drawings wherein like reference characters identify corresponding or similar elements throughout the several views, FIG. 2 depicts a simplified side view of a transportation storage system in accordance with a preferred embodiment of the present application. It will be appreciated that system 201 overcomes one or more of the above-listed problems commonly associated with conventional transportation storage systems.

In the preferred embodiment shown in FIG. 2 side view, system 201 comprises a motorcycle 203 in communication with one or more storage device assemblies 205 via one or more retractable platforms 207 that are disposed within an inner cavity 209 of rear seat 211. In use, the storage device 205 extends from the motorcycle 203 and assembles to form a bin type storage area on the motorcycle 203 that allows for the transport of sundry items. Accordingly, the assembly 205 slidingly engages with seat 211 via the retractable platform 207 in and out of cavity 209 through a housing 303 of the rear seat 211. Thereafter, the assembly 205 is manipulated to form a basket at the rear of the seat 211 as depicted in FIG. 3D.

Figure 4:
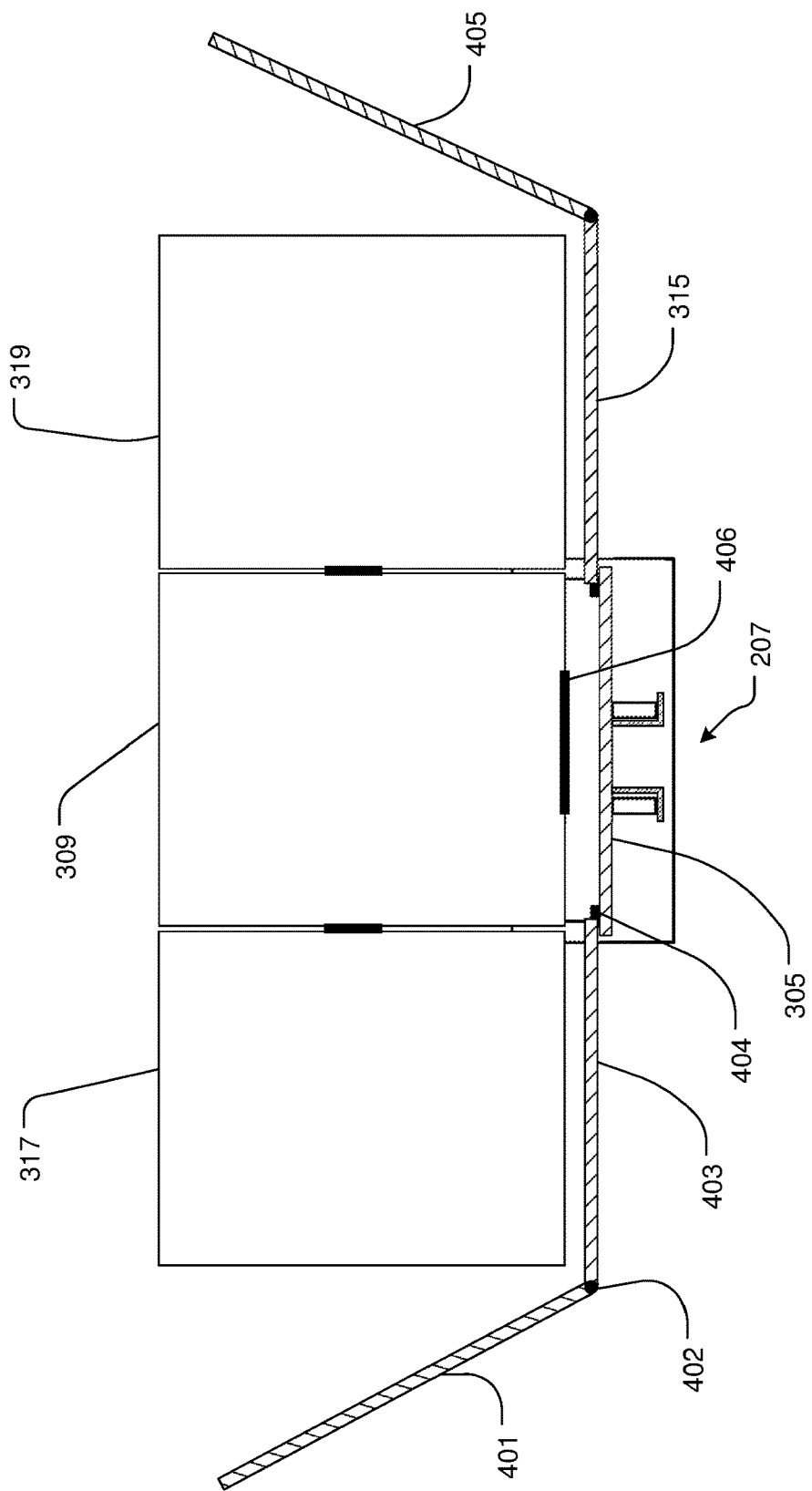
FIG. 4 is a cut view of the system of FIG. 3D.

Referring now to FIGS. 3A, 3B, 3C, and 3D, side views of the storage device assembly 205 of system 201 at various stages of deployment are shown. In the preferred embodiment, storage device assembly 205 is enclosed within housing 303 and comprised of two or more panels 307, 309, 311, 313, 315, 317, 319, 401, 403 and 405 that connect to each other via one or more hinges 302, 304, 306, 308, 310, 312, 402, 404 and 502. See also FIG. 4. It should be understood that for simplicity, the motorcycle is not shown; however it should be understood that housing 303 is disposed within the rear seat of the motorcycle and the assembly 205 is positioned toward the rear of the seat during use.

As depicted, the retractable platform 207 includes a first section 302 having a plurality of rollers 300 configured to slidingly engage with a telescoping elongated shaft 304 that is fixedly secured to the assembly.

It will be appreciated that in current embodiment panels 307, 309, 311, 313, 315, 317, 319, 401, 403, and 405 comprise walls fashioned from bars. That the panels can be fashioned in any manner or from material that enables the storage device 205 to carry items is contemplated herein.

During deployment, retractable platform 305 extends outwards from the vehicle 203 as depicted by motion 3A and the panels 307, 309, 311, 313, 315, 317, 319, 401, 403, and 405 unfold and conform to a retaining shape via motions 3B, 3C, 3D, 3E, 3F, 3G, and 3H.

Figure 5A:
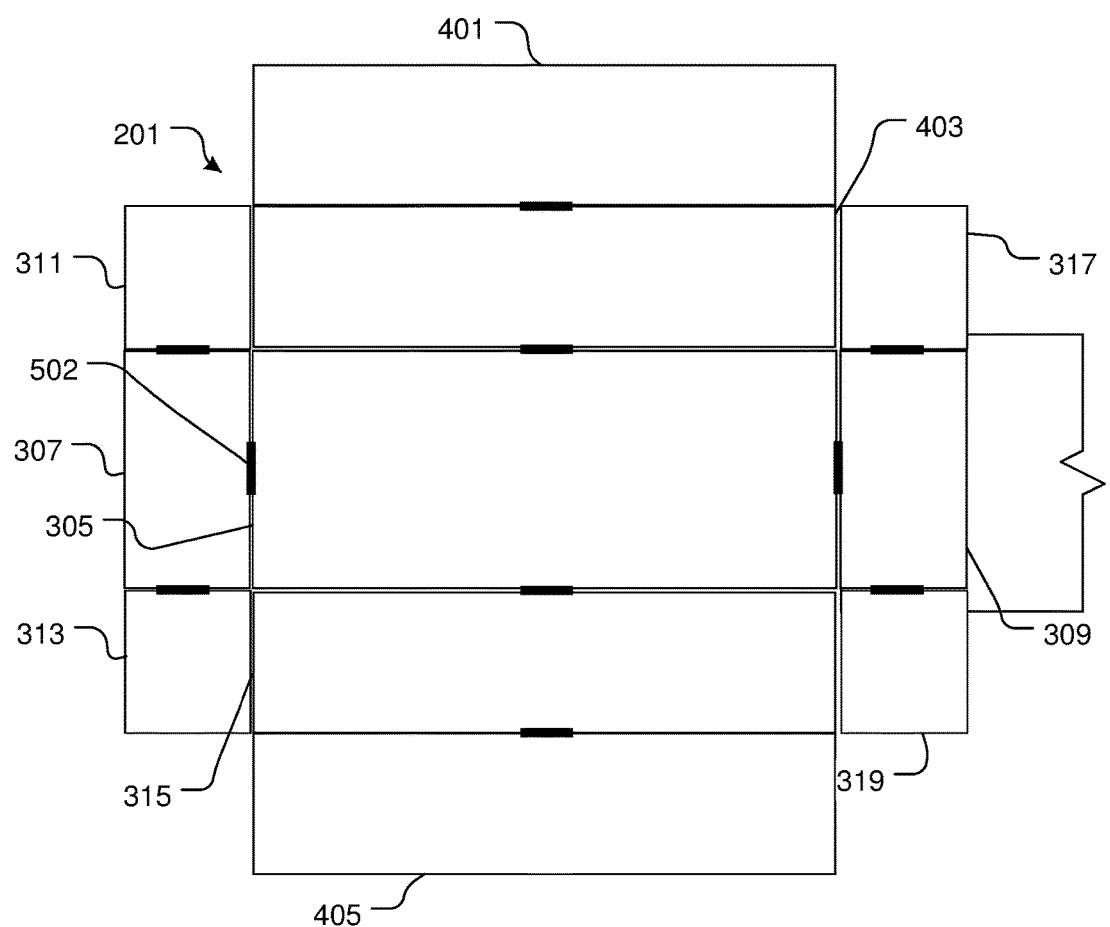
FIGS. 5A and 5B are a top view of the system in an expanded state and a perspective view of the system in an assembled state respectively.
Figure 5B:
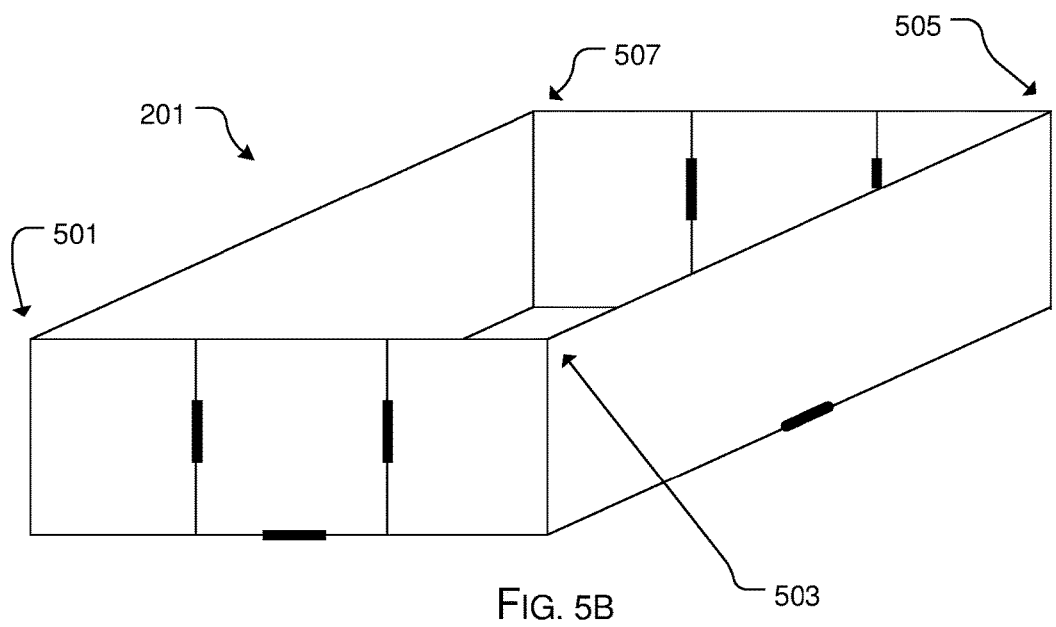

Referring now to FIGS. 5A and 5B the storage device 205 of system 201 is respectively shown in disassembled and assembled conformations. The floor panels 315 and 403 fold out into a position parallel with platform 305 forming the bottom of the storage device 205. The side panels 405 and 401 lock in place perpendicular to the bottom of the storage device 205. The front of storage device 205, is made by panels 311 and 313 and 307 which lock in place perpendicularly to the floor. The rear of storage device 205, is made by panels 317, 319 and 309 which lock in place perpendicularly to the floor.

At locations 501, 503, 505 and 507 the side panels are locked in place. While a hook and rod style joint is depicted as shown in FIG. 6 it is contemplated that any joining method can be utilized. Once the panels 307, 309, 311, 313, 315, 317, 319, 401, 403 and 405 are joined and locked the storage device 205 is ready to transport items as seen fit.

It should be appreciated that one of the unique features believed characteristic of the present application is that the entire storage device 205 can be collapsed and stored within the vehicle 203. This retractable storage area allows for the ability to carry many items and to secure them by straps or other restraining devices.

In one contemplated embodiment, the panels are configured to engage with each other via a locking mechanism, as discussed above; however, it is contemplated having the panels slidingly engage with each other. Accordingly, the panels can be configured to slidingly engage with each other.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A combination motorcycle and storage device, comprising:
    a motorcycle having:
        a rear seat with an internal housing and a rear opening; and
    a storage device having:
        a bottom rigid panel pivotally attached to a plurality of rigid side panels, the rigid side panels are pivotally attached to and fold on the rigid bottom panel, the rigid side panels forming an enclosure
        a plurality of locking devices secured to the rigid side panels, the plurality of locking devices lock each of the rigid side panels to each other to form the enclosure; and
    a retractable platform, having:
        a roller bearing assembly fixedly secured within the internal housing of the rear seat; and
        an elongated telescoping shaft slidingly engaged with the roller bearing assembly and fixedly secured to a bottom surface of the bottom panel, the elongated telescoping shaft is configured to move the storage device from within the internal housing of the seat to an extended position outside the rear opening;
    wherein the storage device forms the enclosure at the rear end of the rear seat and secures in a fixed position via the retractable platform.

* * * * *